US007502774B2

(12) United States Patent
Beavers et al.

(10) Patent No.: US 7,502,774 B2
(45) Date of Patent: Mar. 10, 2009

(54) RING METHOD, APPARATUS, AND COMPUTER PROGRAM PRODUCT FOR MANAGING FEDERATED SEARCH RESULTS IN A HETEROGENEOUS ENVIRONMENT

(75) Inventors: Wade Shelby Beavers, Rochester, MN (US); David Joseph Borrillo, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 457 days.

(21) Appl. No.: 11/008,793

(22) Filed: Dec. 9, 2004

(65) Prior Publication Data

US 2006/0129530 A1 Jun. 15, 2006

(51) Int. Cl.
*G06F 7/00* (2006.01)
*G06F 3/048* (2006.01)
*G06F 17/00* (2006.01)

(52) U.S. Cl. .................. 707/2; 715/201; 715/204; 715/834

(58) Field of Classification Search .............. 707/3, 707/4, 102, 2; 715/201, 204, 834
See application file for complete search history.

(56) References Cited

U.S. PATENT DOCUMENTS

| 5,659,732 | A | * | 8/1997 | Kirsch | 707/5 |
| 5,874,954 | A | * | 2/1999 | Kilmer et al. | 715/834 |
| 2004/0049541 | A1 | * | 3/2004 | Swahn | 709/203 |
| 2004/0128359 | A1 | * | 7/2004 | Horvitz et al. | 709/207 |
| 2005/0192953 | A1 | * | 9/2005 | Neale et al. | 707/4 |

OTHER PUBLICATIONS

Anselm Spoerri, "MetaCrystal", Visualizing The Degree Of Overlap Between Different Search Engines, Dated May 17-22, 2004, pp. 378-379.*

* cited by examiner

*Primary Examiner*—Vincent F Boccio
(74) *Attorney, Agent, or Firm*—Joan Pennington (57) ABSTRACT

A method, apparatus and computer program product are provided for managing federated search results in a heterogeneous environment. A user enters a search term and the search term is submitted to multiple selected search engines. Search results are gathered from each selected search engine. A search ring is generated including a ring section to represent each of the selected search engines for enabling the user to view search results from one or more of the selected search engines.

18 Claims, 6 Drawing Sheets

RING METHOD, APPARATUS, AND COMPUTER PROGRAM PRODUCT FOR MANAGING FEDERATED SEARCH RESULTS IN A HETEROGENEOUS ENVIRONMENT

FIELD OF THE INVENTION

The present invention relates generally to the data processing field, and more particularly, relates to a method, apparatus and computer program product for managing federated search results in a heterogeneous environment.

DESCRIPTION OF THE RELATED ART

Searching is the primary mechanism used to retrieve information on the Internet. Therefore, improving as much as possible the performance of searching can have significant impact on the collective time spent by individuals or organizations to find information.

Technically speaking, improving search performance means decreasing the time it takes users to find the information for a particular search. There are two aspects to decreasing retrieval time. The first aspect is to improve the performance of the software and hardware so that the actual search time is substantially instantaneous. Current technology has nearly made this aspect a reality. The second aspect to decreasing retrieval time is to reduce the amount of time required for users to get the correct result. It is this aspect where significant improvement is needed.

One key way to help users get the results faster is to make sure that best search results are accessible first. For example, from each of multiple data and information sources, a need exists for an effective mechanism to blend and compare the search results from the multiple sources. This is a common requirement in a heterogeneous environment like the World Wide Web or for a federated search that involves multiple search engines and databases.

A well-known example of a federated search is found at www.search.com, which allows web users to search multiple search engines at once. However, a problem with federated searches is how to present the search results. For example, search.com allows two ways to view the results; one including everything blended together and the other includes results by search engine source or by category. Each of these typically provides a very long search result list. In such known arrangements, there is no easy way to compare the search results from the various sources. With federated searches, a problem remains for providing an adequate metaphor to allow the users to manage the complexity of blending and viewing search results from multiple search engines.

A need exists for an effective mechanism or metaphor to allow the user to effectively blend and compare the search results from the multiple sources.

SUMMARY OF THE INVENTION

Principal aspects of the present invention are to provide a method, apparatus and computer program product for managing federated search results in a heterogeneous environment. Other important aspects of the present invention are to provide such method, apparatus and computer program product for managing federated search results in a heterogeneous environment substantially without negative effect and that overcome many of the disadvantages of prior art arrangements.

In brief, a method, apparatus and computer program product are provided for managing federated search results in a heterogeneous environment. A user enters a search term and the search term is submitted to multiple selected search engines. Search results are gathered from each selected search engine. A search ring is generated including a ring section to represent each of the selected search engines for enabling the user to view search results from one or more of the selected search engines.

In accordance with features of the invention, the generated search ring includes a plurality of user-selected controls for selecting search results to be returned. A plurality of concentric circles is included within the generated search ring to indicate priority statistics for each of the selected search engines and each including a user-selected control for selecting search results to be returned for each of the selected search engines.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
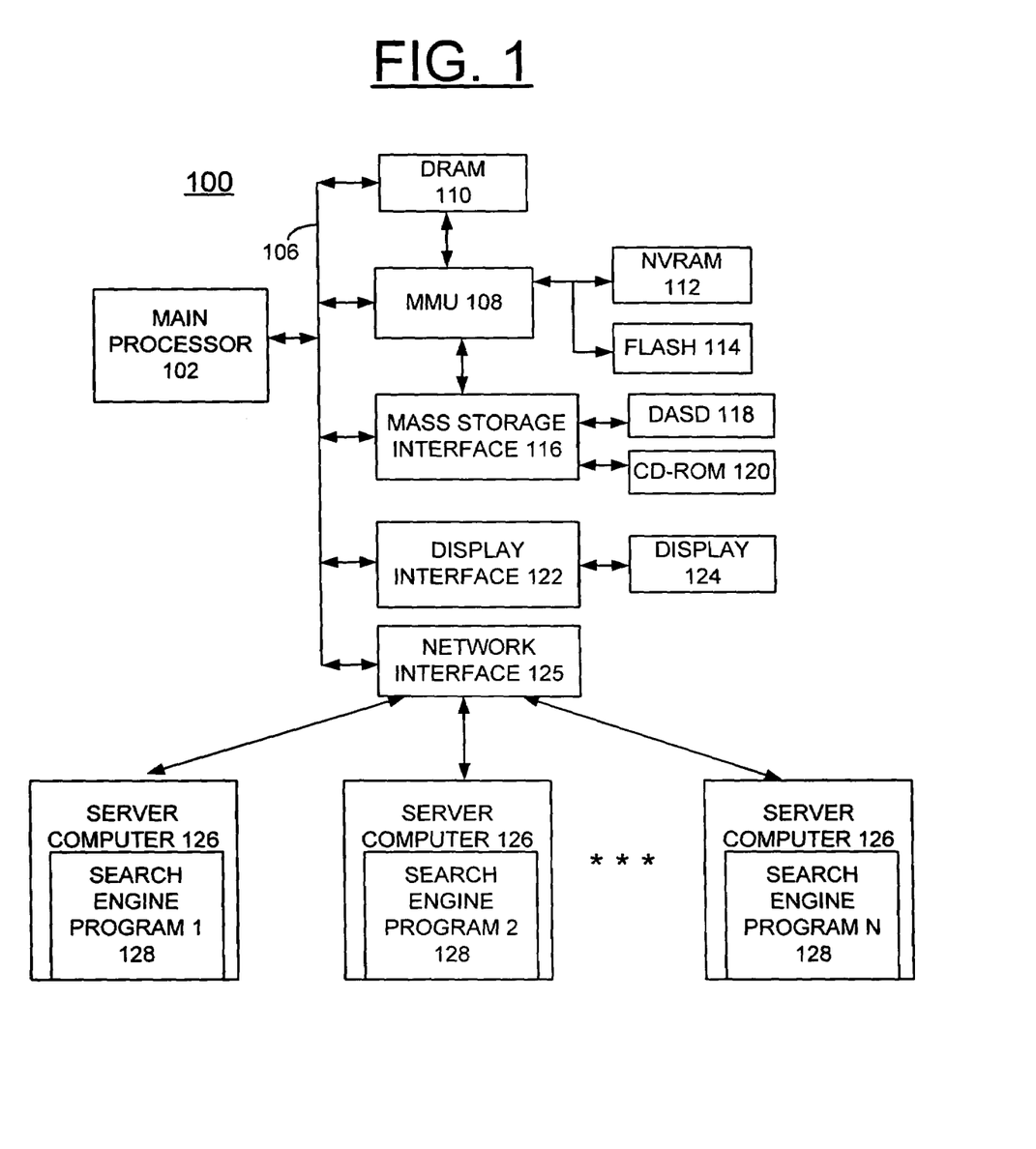
FIGS. 1 and 2 are block diagram representations illustrating a network, a computer system and operating system for managing federated search results in a heterogeneous environment in accordance with the preferred embodiment.
Figure 2:
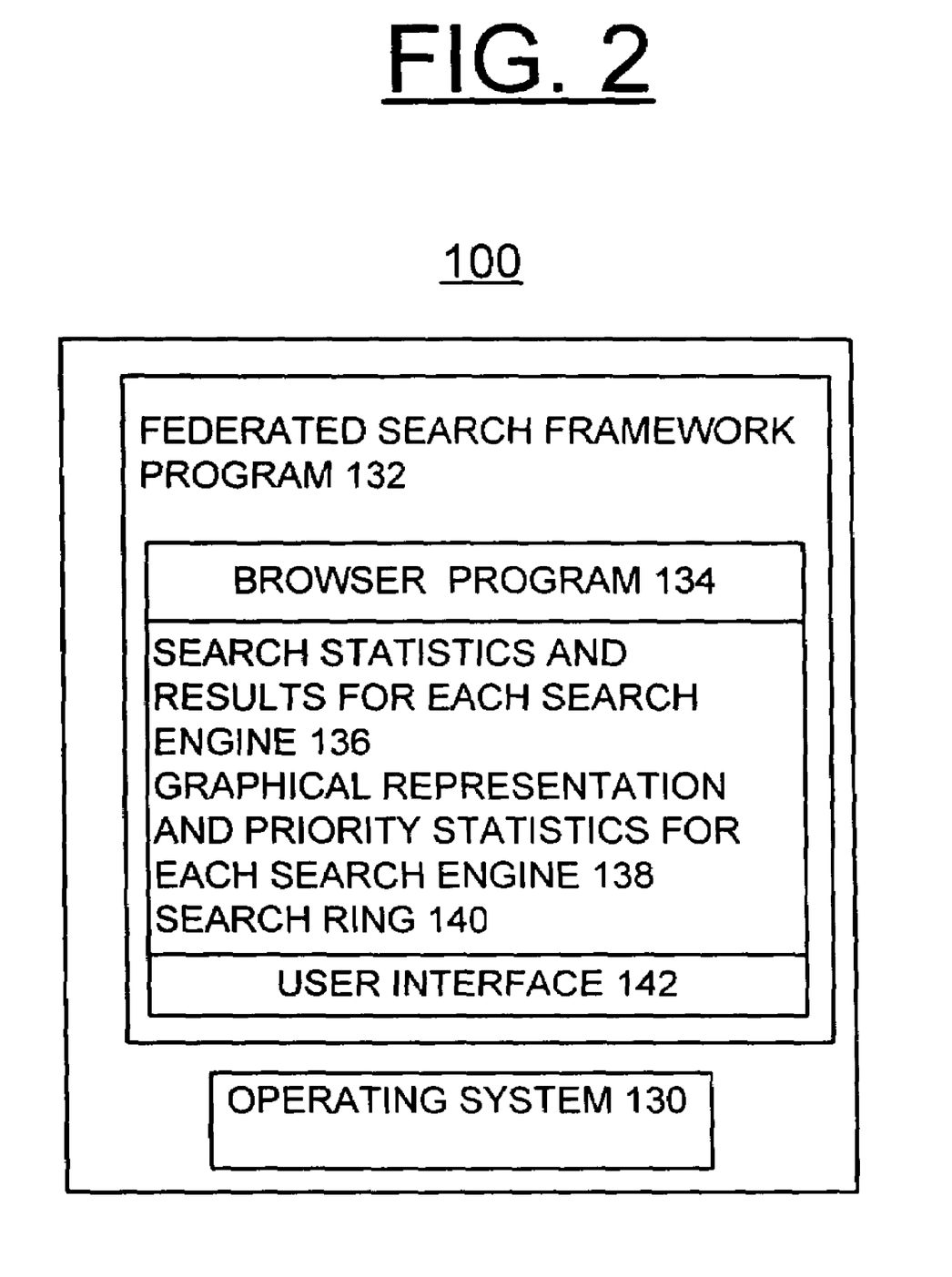

Referring now to the drawings, in FIGS. 1 and 2 there is shown a computer system generally designated by the reference character 100 for managing federated search results in a heterogeneous environment in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124. Computer system 100 includes a network interface 125 coupled by the system bus 106 to the central processor unit (CPU) 102.

As shown in FIG. 1, a plurality of server computers 126 is coupled to the network interface 125 and computer system 100. Each of the server computers 126 includes a search engine program 128, respectively labeled 1-N.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, a federated search framework program 132 of the preferred embodiment, a browser program 134, and memory objects for search statistics and results for each search engine 136, graphical representation and priority statistics for each search engine 138, and a search ring 140 of the preferred embodiment and a user interface 142.

In accordance with features of the preferred embodiments, the user is enabled to process a search request input into computer 100 using a network of server computers 126 such as shown in FIG. 1. The present invention uses multiple search engines 128 to process the search request. Computer system 100 including the federated search framework program 132 generates a search ring for presentation of search results to the user.

Figure 3:
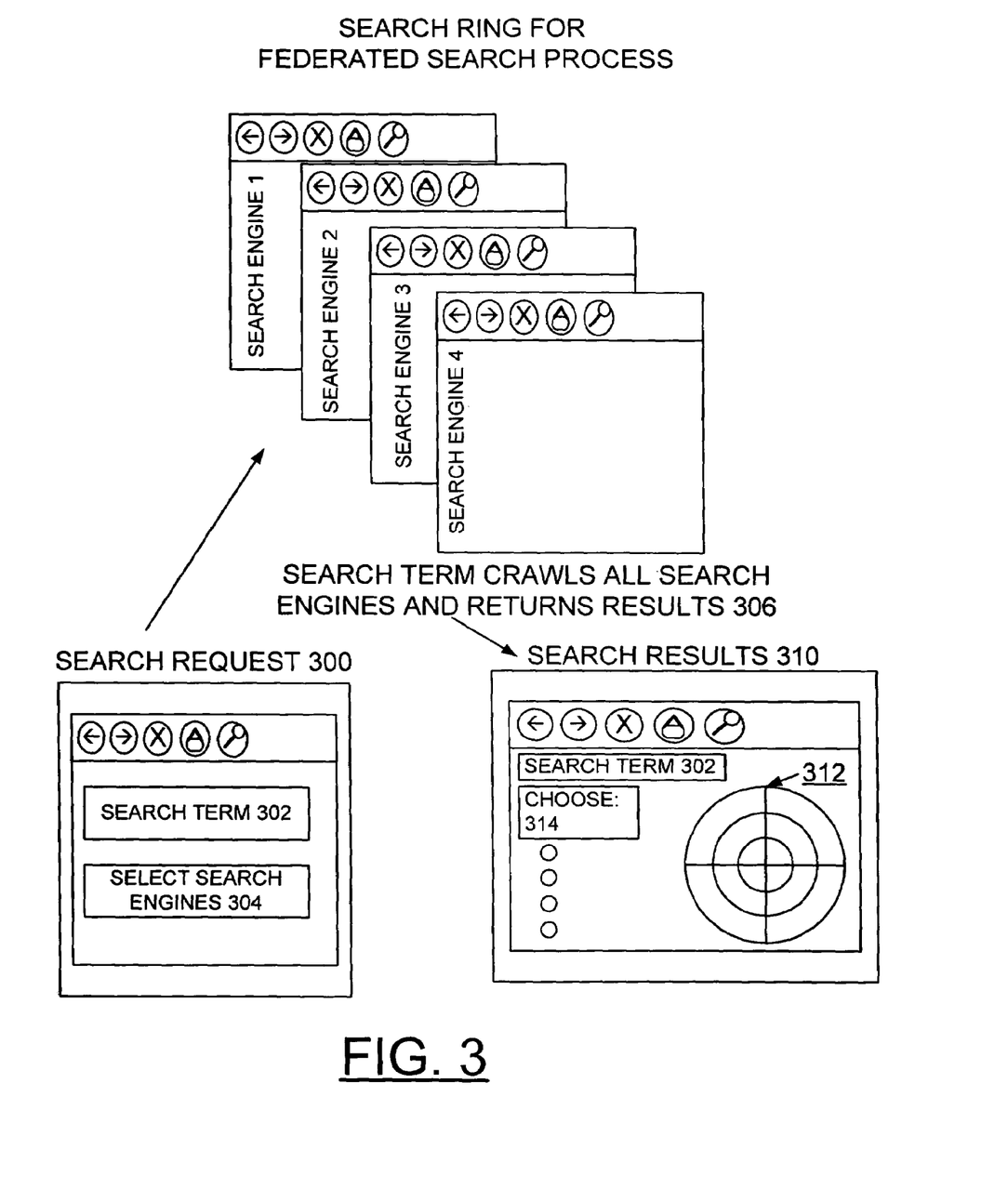
FIG. 3 is a logical flow diagram illustrating a method for managing federated search results in a heterogeneous environment in accordance with the preferred embodiment.
Figure 4:
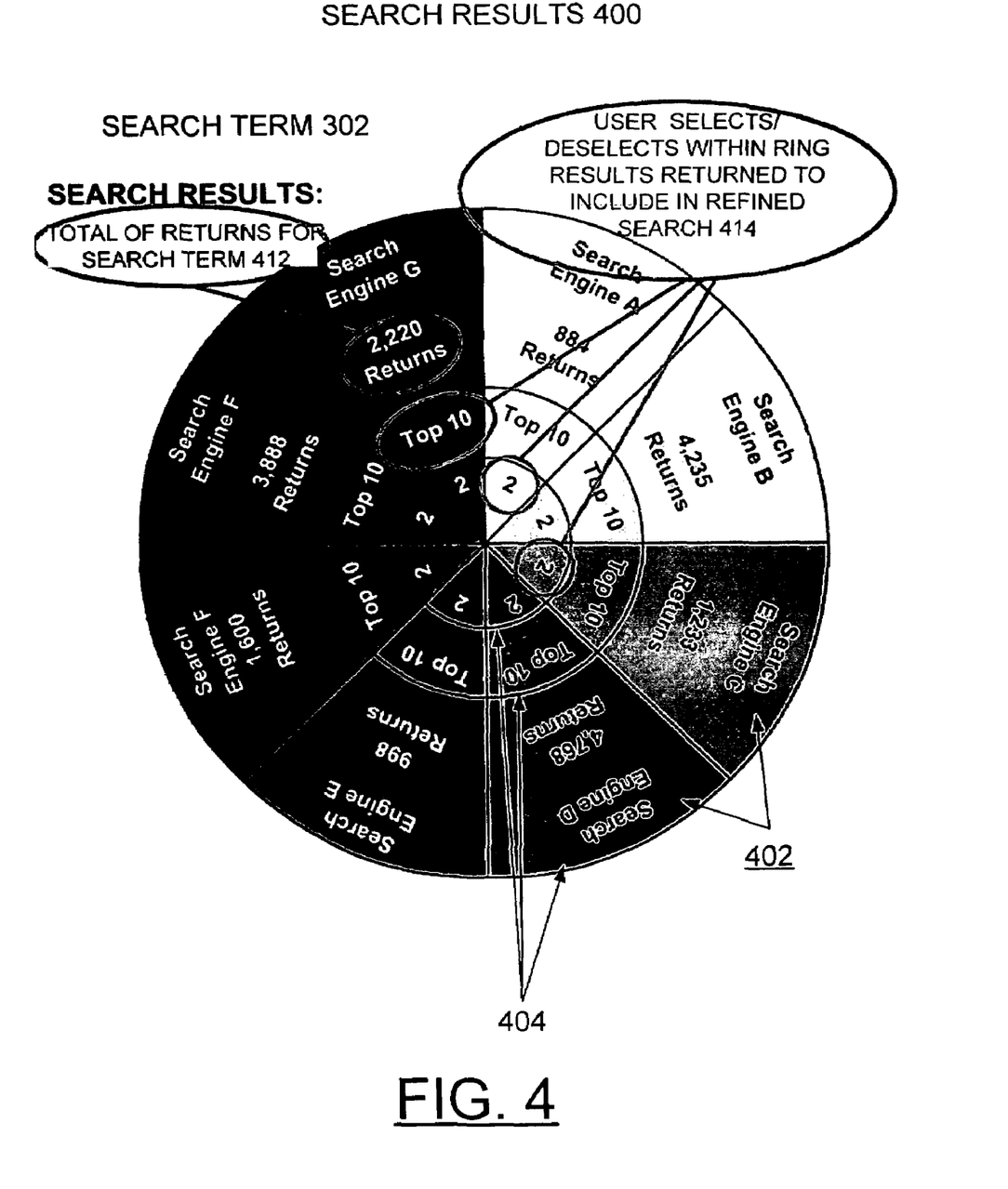
FIG. 4 illustrates an exemplary search ring enabling a user to view and control search results in accordance with the preferred embodiment.

In accordance with features of the preferred embodiments, the generated search ring enables the user to view and control search results in a graphical way. The search ring, for example, as illustrated in FIGS. 3 and 4, allows users to control how to search results are viewed. Users can easily compare the results of two or more search sources and view the best results from all search sources, by entering user selections or de-selections within the search ring. The methods of the preferred embodiments substantially improve ease of use of managing federated search results from all search sources by allowing users to quickly filter the results and easily see what the results represent.

Referring now to FIG. 3, there is shown a logical flow diagram illustrating a method for managing federated search results in a heterogeneous environment in accordance with the preferred embodiment. A graphical user interface for receiving a search request generally designated by the reference character 300 includes a user entered search term 302 and optional user selections of search engines 304 for user entry. The search term 302 crawls all search engines 128, for example, four search engines 1-4, as shown in FIG. 3 and the search engines return results giving the user the option to selectively view concentric circles that represent the priority of search results. A graphical user interface for receiving search results generally designated by the reference character 310 displays the search term 302 and a generated search ring 312. User selections generally designated by the reference character 314 and user-selected entries within concentric circles of the generated search ring 312 enable a user to view and control search results in accordance with the preferred embodiment.

Referring also to FIG. 4, there is shown an exemplary search ring generally designated by the reference character 400 for enabling a user to view and control search results in accordance with the preferred embodiment. The exemplary search ring 400 shows search results from the multiple search engines 128, each within a respective section 402 of the search ring 400. Each section or pie slice 402 represent a data or search source. A plurality of concentric circles 404 represents the priority of the search results. A user selection of all the slices 402 at the innermost circle 404 represent, for example, the top results for all search engines 128. Clicking on these slices 402 of the innermost circle 404 would show all these search results to the user. The results displayed are based upon the particular slice 402 selected by the user combined with the distance from the center of search ring 400, such as shown in FIG. 4.

It should be understood that various options are possible for enabling a user to view and control search results in accordance with the preferred embodiment. For example, clickable dots can be provided within the concentric circles 404 for each of the search engine slices 402 to represent links. Another variation would make the circles represent the intersection of the search engines 128 or data sources. For example, the center circle would represent the results common to all search sources tather than the top results for each search source such as shown in FIG. 4. Still another variation would be to use one circle for each search source and show the olympic rings view to indicate intersection of links. Then if the user selected a section between two rings, the results common to those two search sources would be shown.

Figure 5:
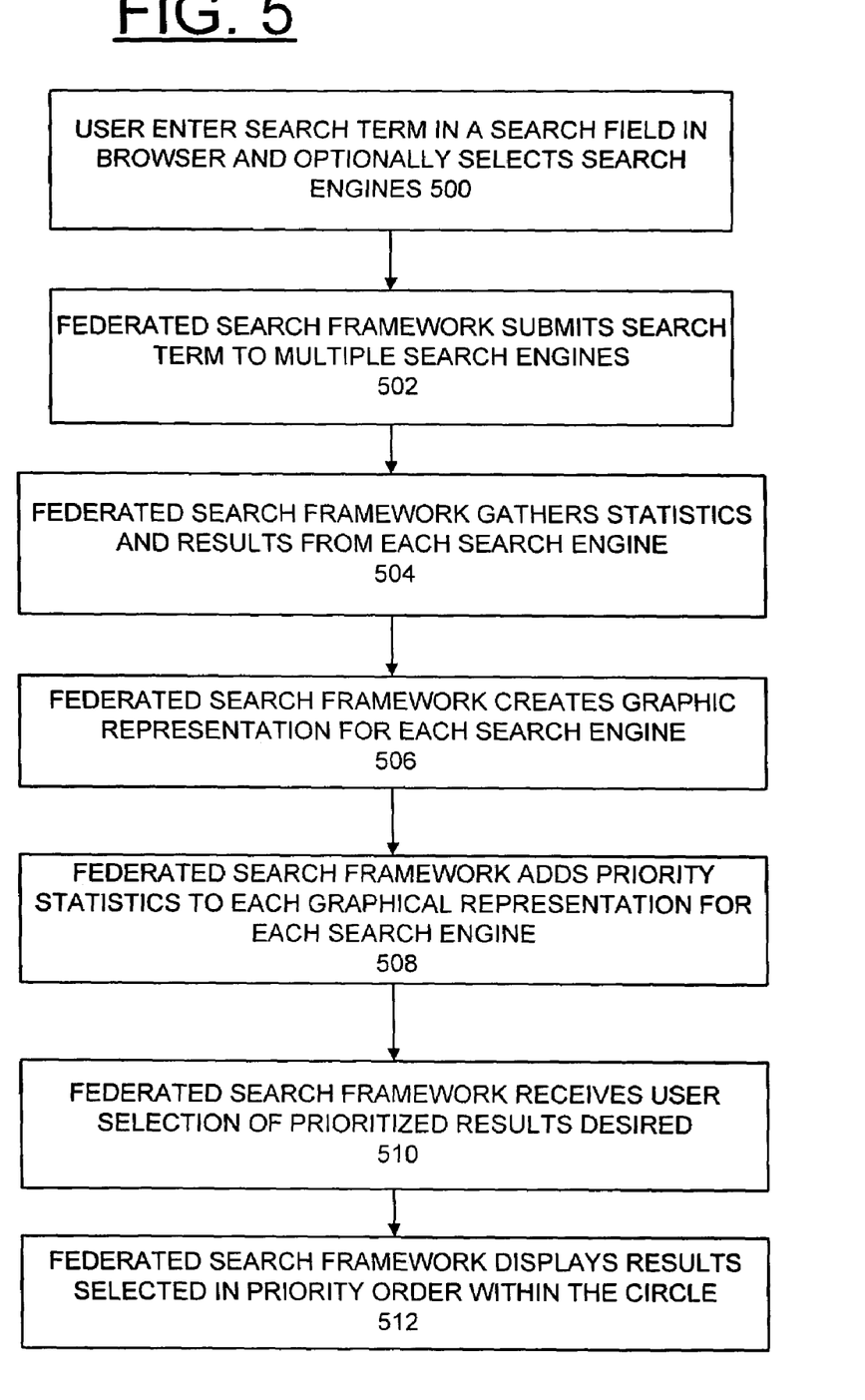
FIG. 5 is a flow chart illustrating exemplary sequential steps for managing federated search results in a heterogeneous environment in accordance with the preferred embodiment.

Referring now to FIG. 5, there are shown exemplary sequential steps for managing federated search results in a heterogeneous environment in accordance with the preferred embodiment. First a user enters a search term in a search field in a browser program 134 as indicated in a block 500. The federated search framework 132 submits the search term to multiple search engines as indicated in a block 502. The federated search framework 132 gathers statistics and search results from each of the multiple search engines as indicated in a block 504.

Then the federated search framework 132 creates a graphic representation for each of the multiple search engines as indicated in a block 506. Next the federated search framework 132 adds priority statistics to each graphical representation for each of the multiple search engines as indicated in a block 508. The federated search framework 132 receives user selections of prioritized results desired for the multiple search engines as indicated in a block 510. Then the federated search framework 132 displays search results selected in priority order with the circle, such as search ring 400, as indicated in a block 512.

Figure 6:
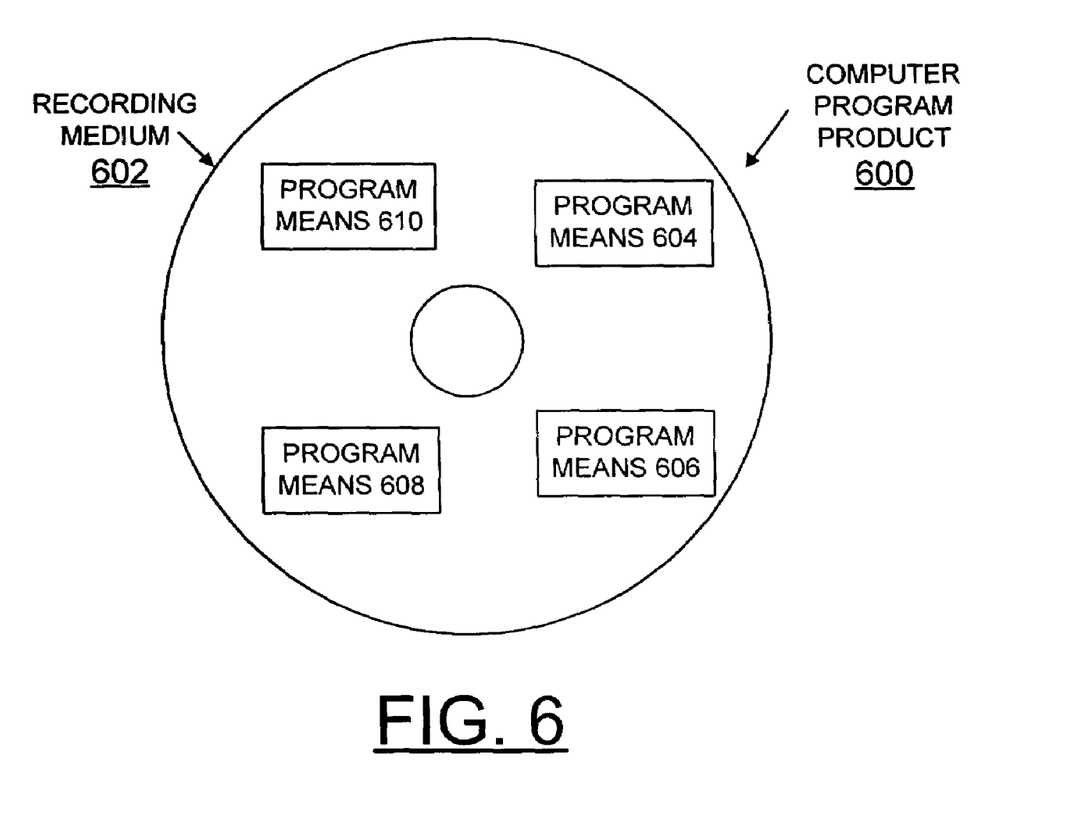
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, or a similar computer program product. Recording medium 602 stores program means 604, 606, 608, 610 on the medium 602 for carrying out the methods for managing federated search results of the preferred embodiment in the computer system 100 of FIG. 1.

A sequence of program instructions or a logical assembly of one or more interrelated modules defined by the recorded program means 604, 606, 608, 610, direct the computer system 100 for managing federated search results of the preferred embodiment.

Embodiments of the present invention may also be delivered as part of a service engagement with a client corporation, nonprofit organization, government entity, internal organizational structure, or the like. Aspects of these embodiments may include configuring a computer system to perform, and deploying software and web services that implement, some or all of the methods described herein. This software maybe deployed as a client-side application, a server-side application, or a combination thereof. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for use of the systems.

While the present invention has been described with reference to the details of the embodiments of the invention shown in the drawing, these details are not intended to limit the scope of the invention as claimed in the appended claims.

What is claimed is:

1. A method for managing federated search results in a heterogeneous environment comprising:

receiving a user-entered search term and submitting the search term to multiple selected search engines;

gathering search results from each of the selected search engines;

generating a search ring including a respective ring section to represent search results from each respective one of the selected search engines for enabling the user to view search results from the selected search engines; and generating a plurality of concentric circles within the generated search ring to indicate priority statistics for each of the selected search engines including a pair of inner concentric circles indicating set numbers of user selected prioritized results, and an outer ring including a number of returns from each of the selected search engines; and generating a user-selected control within each said concentric circle portion of each said ring section; each said generated user-selected control for selecting search results to be returned for each of the selected search engines.

2. A method for managing federated search results as recited in claim 1 wherein the step of gathering search results from each of the selected search engines includes the steps of gathering search statistics from each of the selected search engines.

3. A method for managing federated search results as recited in claim 1 includes the steps of creating a graphical representation for each of the selected search engines.

4. A method for managing federated search results as recited in claim 3 includes the steps of adding priority statistics to each said graphical representation for each of the selected search engines.

5. A method for managing federated search results as recited in claim 4 includes the steps of receiving a user-entered selection of prioritized search results.

6. A method for managing federated search results as recited in claim 5 includes the steps of displaying user selected prioritized search results in priority order within the search ring.

7. A method for managing federated search results as recited in claim 1 wherein the step of generating a search ring includes the steps of generating a plurality of said user-selected controls for selecting search results to be returned.

8. Apparatus for managing federated search results in a heterogeneous environment comprising:

a browser program for receiving a user-entered search term and submitting the search term to multiple selected search engines;

a federated search framework program for gathering search results from each of the selected search engines; and for generating a search ring including a respective ring section to represent search results from each respective one of the selected search engines for enabling the user to view search results from the selected search engines; generating a plurality of concentric circles within the generated search ring to indicate priority statistics for each of the selected search engines including a pair of inner concentric circles indicating set numbers of user selected prioritized results and an outer ring including a number of returns from each of the selected search engines; and generating a user-selected control within each said concentric circle portion of each said ring section; each said generated user-selected control for selecting search results to be returned for each of the selected search engines; and said browser program and said federated search framework program embodied on a computer-readable medium; said computer-readable medium consisting one of a floppy disk, a hard disk, a high capacity read only memory in the form of an optically read compact disk or CD-ROM, a DVD, a tape, a read only memory (ROM), and a random access memory (RAM).

9. Apparatus for managing federated search results as recited in claim 8 wherein said federated search framework program creates a graphical representation for each of the selected search engines.

10. Apparatus for managing federated search results as recited in claim 9 wherein said federated search framework program adds priority statistics to each said graphical representation for each of the selected search engines.

11. Apparatus for managing federated search results as recited in claim 8 wherein said federated search framework program, responsive to a user-entered selection of prioritized search results, displays user selected prioritized search results in priority order within the search ring.

12. A computer-readable medium encoded with a computer program product for managing federated search results in a computer system, said computer-readable medium consisting one of a floppy disk, a hard disk, a high capacity read only memory in the form of an optically read compact disk or CD-ROM, a DVD, a tape, a read only memory (ROM), and a random access memory (RAM), said computer program product including instructions executed by the computer system to cause the computer system to perform the steps of:

receiving a user-entered search term and submitting the search term to multiple selected search engines;

gathering search results from each of the selected search engines;

generating a search ring including a respective ring section to represent search results from each respective one of the selected search engines for enabling the user to view search results from the selected search engines;

generating a plurality of concentric circles within the generated search ring to indicate priority statistics for each of the selected search engines including a pair of inner concentric circles indicating set numbers of user selected prioritized results and an outer ring including a number of returns from each of the selected search engines; and generating a user-selected control within each said concentric circle receiving search results from the multiple search engines; and transmitting information that, when interpreted by the user terminal, allows the user terminal to generate a search ring, the search ring including a respective ring section to represent the search results from each respective one of the multiple search engines; and allows the user terminal to generate a plurality of concentric circles within the generated search ring to indicate priority statistics for each of the selected search engines including a pair of inner concentric circles indicating set numbers of user selected prioritized results and an outer ring including a number of returns from each of the selected search engines; and to generate a user-selected control within each said concentric circle portion of each said ring section; each said generated user-selected control for selecting search results to be returned for each of the multiple search engines.

13. A computer-readable medium encoded with a computer program product for managing federated search results as recited in claim 12 wherein the step of gathering search results from each of the selected search engines includes the steps of gathering search statistics from each of the selected search engines.

14. A computer-readable medium encoded with a computer program product for managing federated search results as recited in claim 12 includes the steps of creating a graphical representation for each of the selected search engines.

15. A computer-readable medium encoded with a computer program product for managing federated search results as recited in claim 14 includes the steps of adding priority statistics to each said graphical representation for each of the selected search engines.

16. A computer-readable medium encoded with a computer program product for managing federated search results as recited in claim 12 includes the steps of displaying user selected prioritized search results in priority order within the search ring.

17. A method for managing federated search results in a heterogeneous environment, comprising:

receiving a search term from a user terminal;
submitting the search term to multiple search engines;
receiving search results from the multiple search engines; and
transmitting information that, when interpreted by the user terminal, allows the user terminal to generate a search ring, the search ring including a respective ring section to represent the search results from each respective one of the multiple search engines; and allows the user terminal to generate a plurality of concentric circles within the generated search ring to indicate priority statistics for each of the selected search engines; and to generate a user-selected control within each said concentric circle portion of each said ring section; each said generated user-selected control for selecting search results to be returned for each of the multiple search engines.

18. The method of claim 17, further comprising:
creating an account associated with a user;
metering use of the method for managing federated search results by the user; and
billing the user for the metered use.

* * * * *